United States Patent [19]
Sutkowski

[11] 3,735,833
[45] May 29, 1973

[54] THEFT PREVENTION DEVICE FOR MOTOR VEHICLES

[76] Inventor: Joseph Sutkowski, 15600 Woodbrook Avenue, Maple Height, Ohio 44137

[22] Filed: Oct. 12, 1971

[21] Appl. No.: 188,363

[52] U.S. Cl.............180/112, 180/114, 307/10 AT, 335/77, 340/64
[51] Int. Cl................................................B60r 25/04
[58] Field of Search.........................180/112, 114; 292/201; 340/63, 64; 335/68, 69, 72, 77, 114; 317/134; 307/10 AT

[56] References Cited

UNITED STATES PATENTS

| | | | |
|---|---|---|---|
| 2,139,183 | 12/1938 | Bruns | 180/112 |
| 2,285,397 | 6/1942 | Allen | 335/68 |
| 2,674,334 | 4/1954 | Uberbacher | 180/113 |
| 3,548,373 | 12/1970 | Rivera | 180/112 |
| 3,566,703 | 3/1971 | Van Noord | 180/111 |
| 3,649,782 | 3/1972 | Feldman | 307/10 AT |

Primary Examiner—Richard J. Johnson
Assistant Examiner—Reinhard Eisenzopf
Attorney—Robert H. Heise

[57] ABSTRACT

A theft prevention device which is controlled through a door lock wherein the operating components are connected in operating position when the door lock is open and in inoperative position when the door lock is locked.

10 Claims, 8 Drawing Figures

THEFT PREVENTION DEVICE FOR MOTOR VEHICLES

DISCUSSION OF THE PRIOR ART

Various devices have been proposed to prevent motor vehicle thefts. These in general are of a complex nature, requiring excessive expenditures, and which may be easily by-passed by the experience thief. Furthermore, many of these devices are difficult to service or to apply to existing vehicles. The components proposed in many of the prior art devices are additional to the standard components which present problems of mounting, additional costs and require instruction to the user, who normally is not technically oriented.

In addition, the non-standard wiring and apparatus, if vandalized by the thief, would prevent the ordinary mechanic who would be available from servicing the vehicle and such incapacitated vehicle would then be subject to stripping, etc., if not towed away.

SUMMARY OF THE INVENTION

The present invention is concerned with a novel, simple, but effective means for preventing theft of a motor vehicle.

A general object of the invention is to provide a device which comprises a switching means mounted on the door latch which is actuated pursuant to turning of the key between locking and unlocked positions.

More specifically, the invention embodies a novel switch mechanism which is adapted to be mounted on the lock bolt within the car door and which closes appropriate circuits to open the circuits, for example, to the ignition, and/or the hood latch and/or the trunk latch when the door is unlocked and which opens the circuits when the door is closed.

The invention contemplates utilization of a window operator in current use with a sector modified to incorporate a switch and a door latch.

These and other objects and advantages inherent in and encompassed by the invention will become more apparent from the specifications and the drawings, wherein.

Figure 5:
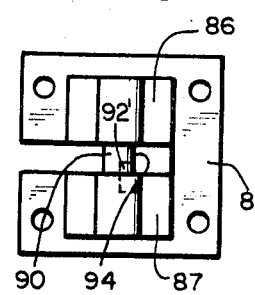
FIGS. 5, 6 and 7 show an auxiliary trunk lock.
Figure 6:
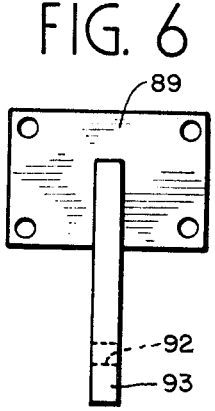

FIG. 5 being a top view of the bottom jam;

FIG. 6 being an end view of the lid jam; and

Figure 7:
Figure 2:
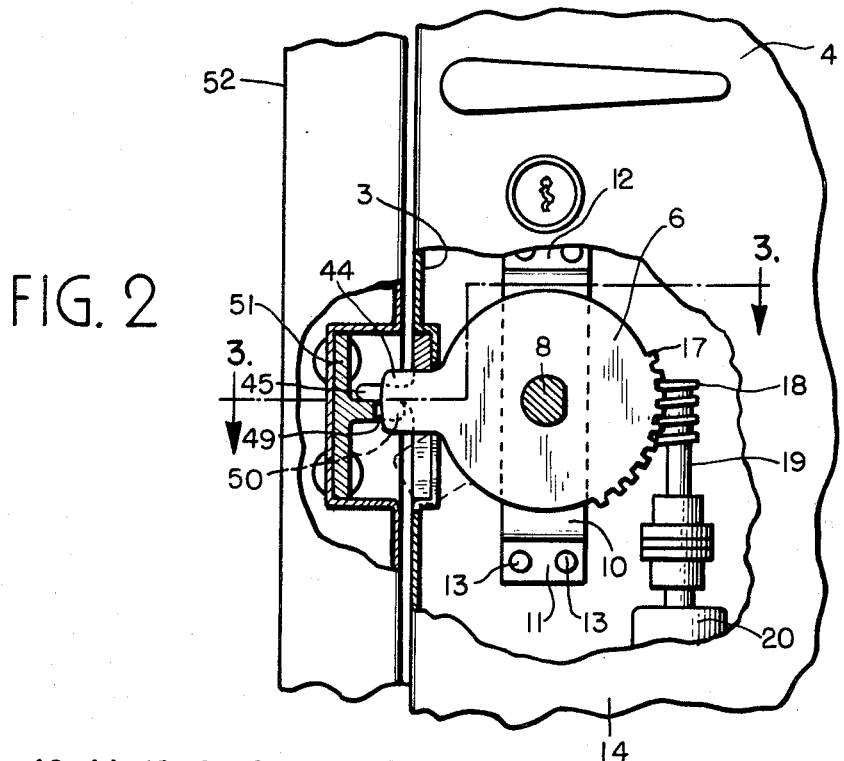
FIG. 2 is a vertical sectional view of the door lock taken on line 2—2 of FIG. 3.
Figure 3:
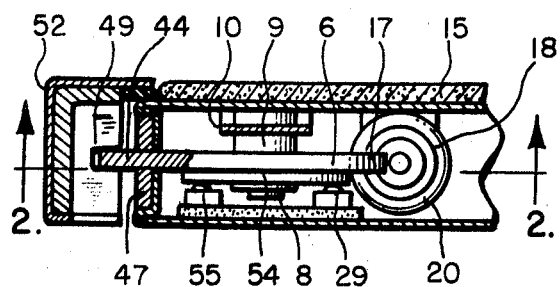
FIG. 3 is a cross-sectional view of the structure shown in FIG. 2 taken substantially on line 3—3 of FIG. 2.
Figure 4:
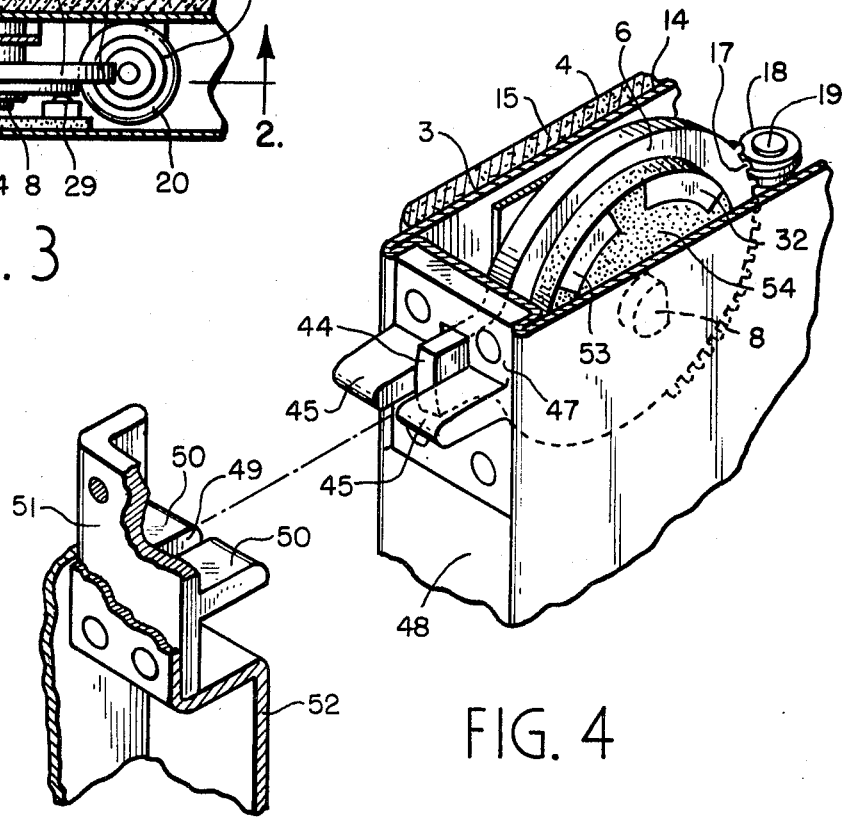
FIG. 4 is a separated lock and catch assembly according to the invention shown in perspective.

FIG. 7 being a side view of the lid jam.

DESCRIPTION OF THE INVENTION

Describing the invention in detail and having particular reference to the drawings, the lock generally designated 2 is mounted in the door well 3 of the driver's side door 4.

The lock comprises an annulus or disk 6 which is connected to a center shaft 8, the shaft being rotatably mounted in a bearing 9 which is fixed to a standoff mounting 10. The mounting 10 may comprise a strap having foot pads 11, 12 at opposite ends which are suitably secured as by screws 13, 13 to the inner panel 14 of the door which provides a backing for the outer skin panel 15.

The annulus 6 comprises a tooth sector 17 which is driven by a worm gear 18 mounted on the output shaft 19 of a reversible electric motor 20.

The motor 20 has a housing 21 which may be suitably secured to panel 14 by screws 22. The motor 20 is of conventional type currently in use for raising and lowering car windows.

Figure 1:
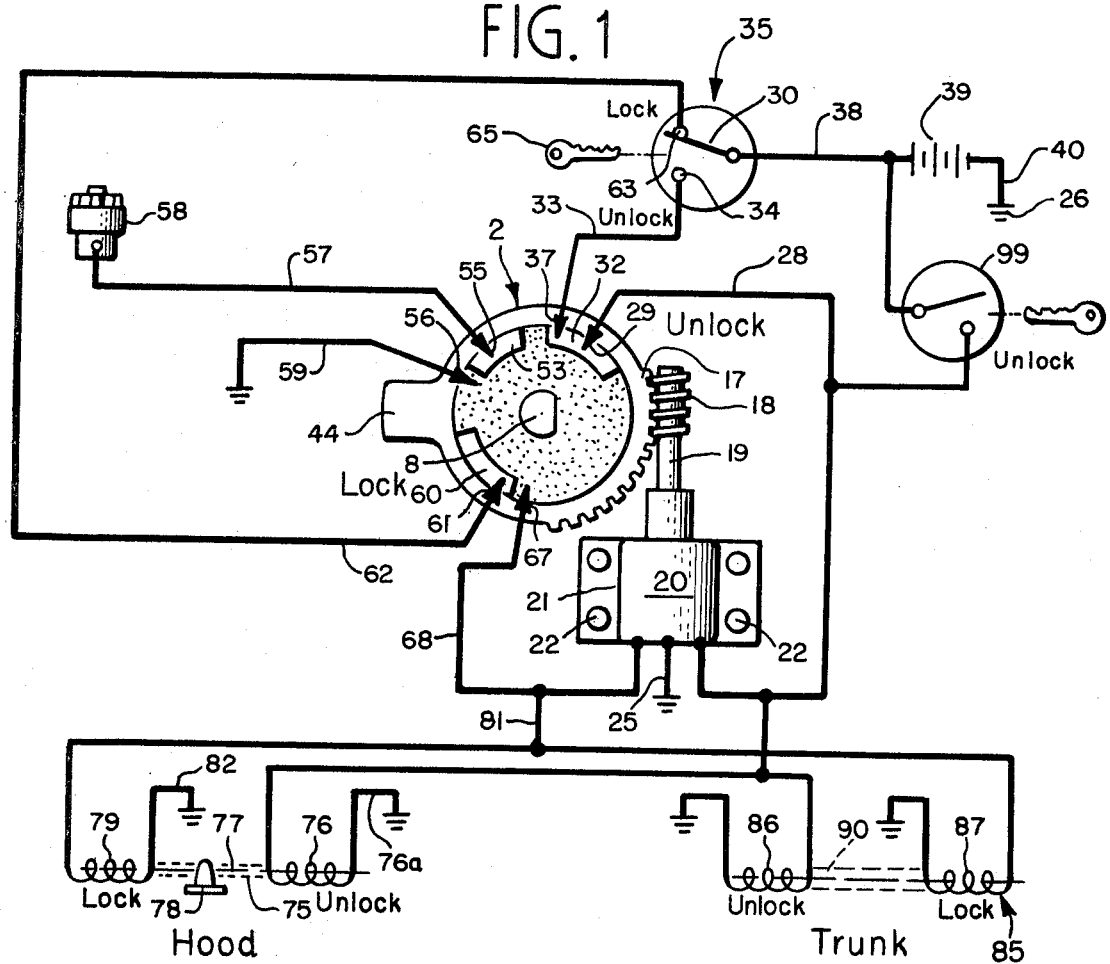
FIG. 1 is a wiring diagram incorporating the invention, showing the circuit in open position.

As best seen in FIG. 1, the motor has a common lead 25 which is connected to ground 26, which may be the vehicle body as well known to those skilled in the art.

A lead 28 is connected to one end of the motor windings and is connected to a contact 29 which is connected in the unlocked position of the switch 30 through a connector or shunt strip 32 through lead or wire 33 to a contact 34 of the key lock 35 which comprises the switch 30.

Figure 1A:
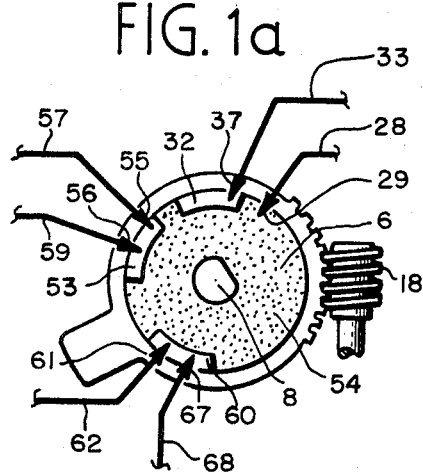
FIG. 1A shows the unlocked position of the lock.

The switch 30 in the unlocked position of the key lock 35 is closed with contact 37 of the lead 33 completing a circuit through a battery lead 38 connected to the battery 39, the battery 39 having a lead 40 connected to ground 26. The motor turns the arm in a direction to rotate the annulus disk 6 in a counterclockwise direction (FIG. 1) to unlock the bolt 44 downwardly from between the lugs 45, 45 of the jam 47 mounted on the door edging 48 and from the slot 49 between the lugs 50 of the catch 51 on the door pillar 52. Rotation of the motor to unlocking position continues until the spring contact 29 rides off the arcuate connector strip 32 as best seen in FIG. 1a. The disk or annulus 6 is provided with a dielectric facing 54 which is bonded to the disk and supports the metal connector strip 32.

The facing 54 has another connector strip 53 secured thereto which in the unlocked condition connects contacts 55, 56, contact 55 being connected through lead 57 to the distributor 58 and contact 56 being connected through line 59 to ground 26.

As best seen in FIGS. 1 and 1a, the disk has a still another connector strip 60 which in the unlocked position is engaged with contact 61 which in turn is connected through lead 62 to a switch contact 63 of the key lock. The arm 30 connects with lead 33 and through the battery to ground as heretofore stated.

To actuate the mechanism from the unlocked to locked position, the key 65 is turned in the door key lock in locking direction. A circuit is completed through arm 31, and the battery to ground. The lead 62 conducts current through contact 61 through strip 60 to a contact 67, which connects to a lead 68 connected to the other end of the winding of the motor. This causes the motor to rotate in a direction causing the disk 6 to rotate clockwise from the position of FIG. 1a to that shown in FIG. 1. As the disk 6 so rotates, the contact 67 slides off connector 60, opening the circuit and stopping the motor. Also the contact 56 slides off strip 53 and the contact 29 slides onto the strip 32. The placement of the contacts is such that the inertia and overrun of the motor is sufficient to drive the disk far enough to establish lock and unlock contacts, while the reversive contacts slide off the respective connector strips.

Simultaneously with the actuation of the motor and rotation of the lock between locking and unlocking positions, a hood latch 75 connected in the circuit is correspondingly shifted from locked to unlocked positions and vice versa consistent with the position of the door key lock. To lock the hood the current flows through the lead 28 and the battery as hereinbefore described to locking position of the lock, the solenoid 76 is energized (current flowing therethrough from lead 28 to ground via lead 76a) and the unlocking bolt 77 is withdrawn from the hasp 78 mounted on the vehicle body, the bolt 77 being supported with solenoids 76, 79 on a car hood (not shown). When the lock is to be locked, the circuit current flow is through the lead 68 and through lead 81, the solenoid coil 79, and to ground via lead 82. The bolt then is shuttled into the solenoid 79 and drawn through the hasp.

Simultaneously with the locking and unlocking of the hood latch, a trunk latch generally designated 85 is locked and unlocked. A solenoid 86 is connected with line 28 and ground and solenoid 87 is connected with line 68 and ground. The solenoid jam 88 is adapted to be mounted on the trunk body and the lid jam 89 is mounted on the lid and has a notch 92 to engage the bolt 90 which shuttles between the solenoids 86 and 87. In the unlocked position the bolt has a notch 92' which aligns with the catch portion 93 of the lid jam and thus unlocks the lid lock. In locked position the solid portion 94 of the bolt extends into notch 92 in the catch 93.

A bypass switch 99 is connected between the battery and the hood lock solenoids to operate the same independently of the door lock upon malfunctioning of the latter.

Thus, a novel and effective arrangement has been described to inhibit motor vehicle theft, the device being practical and effective, and relatively inexpensive and utilizes proven components.

It will be understood that particular embodiments of the invention have been described for purposes of illustration; it will be noted, however, that various modifications and adaptations thereof may be suggested to those skilled in the art without departing from the spirit and the scope of the invention as defined in the appended claims:

I claim:

1. A system for preventing theft of a vehicle having an electrical storage battery and a plurality of doors providing access to the interior of the vehicle, the system comprising a key-operated door lock in at least one of the doors; a two-position switch associated with said door lock; a rotary lock bolt-operating disk, a reversible electrical motor for driving the disk; a first connector means on the disk for connecting the motor with the battery to run in a direction unlocking the lock from a locked position attendant to the key being rotated to an unlocking position; and second connector means on the disk for connecting the motor with the battery to run in a direction locking the lock from an unlocked position attendant to the key being rotated to a locking position.

2. The invention according to claim 1 and a hood lock comprising a pair of solenoids, and a bolt core slidable into one solenoid in unlocking position and into the other solenoid in locking position; means for connecting said one solenoid in series with said first connector means; and means for connecting the other solenoid in series with the second connector means.

3. The invention according to claim 2 and a trunk lock having a pair of solenoids with a locking bolt core slidable from one solenoid to the other, attendant to excitation of the respective solenoids, and means for connecting said one and the other solenoids in parallel with respective one and the other solenoids of the hood lock.

4. The invention according to claim 1 and a distributor ground lead and means for connecting and disconnecting said lead comprising connector means on the disk and movable therewith between locked and unlocked positions.

5. The invention according to claim 1 and said connector means comprising electrical conducting strips on the disk and contact means from the battery, said motor having contacts, each strip being associated with one battery and one coil contact and having a displacement to connect one pair of contacts while the other pair of contacts is disconnected.

6. The invention according to claim 1, and said disk having a toothed sector, and said motor having a worm gear driving said sector, and said disk mounting said connector means at circumferentially displaced positions, and said motor and battery having pairs of contacts associated with respective connector means.

7. The invention according to claim 6 and a distributor lead having a contact adjacent to the disk, a ground lead having a contact adjacent to the disk, connector means on the disk having a length to bridge the contacts in the open position of the door lock and movable with the disk to closed position sliding off at least one contact.

8. The invention according to claim 1 wherein said disk comprises a bolt and the door comprises a bolt-receiving jam, and said disk rotatable about an axis transverse to the door.

9. The invention according to claim 8, and said motor and disk being located in said door and said key lock operable of the locking and unlocking switch, and said motor having a momentum overrun to drive said disk to positions disconnecting the motor from the battery to stop the operation of the motor at the end of the locking and unlocking directions.

10. The invention according to claim 2 and an auxilliary switch for opening the hood lock when the door lock is closed during malfunctioning of the door lock.

* * * * *